No. 672,640. Patented Apr. 23, 1901.
J. S. HIGHFIELD.
AUTOMATIC BOOSTER IN CONNECTION WITH MULTIPLE WIRE SYSTEMS.
(Application filed Feb. 2, 1901.)
(No Model.)
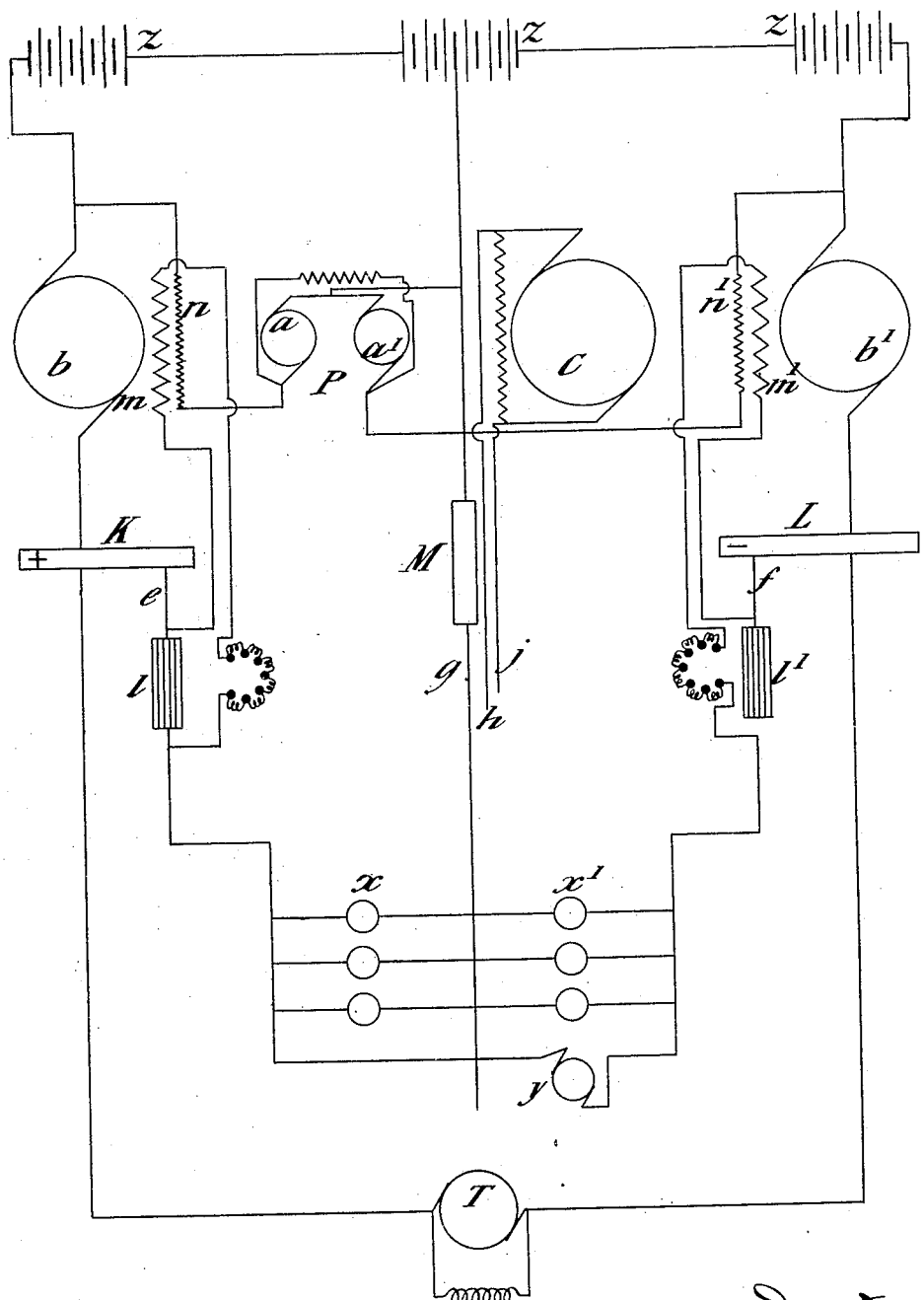

UNITED STATES PATENT OFFICE.

JOHN SOMERVILLE HIGHFIELD, OF ST. HELENS, ENGLAND.

AUTOMATIC BOOSTER IN CONNECTION WITH MULTIPLE-WIRE SYSTEMS.

SPECIFICATION forming part of Letters Patent No. 672,640, dated April 23, 1901.

Application filed February 2, 1901. Serial No. 45,753. (No model.)

*To all whom it may concern:*

Be it known that I, JOHN SOMERVILLE HIGHFIELD, a citizen of England, residing at Windle House, St. Helens, in the county of Lancaster, England, have invented a certain new and useful Automatic Booster in Connection with Multiple-Wire Systems, (for which I have applied for a patent in Great Britain, dated July 18, 1900, No. 12,972,) of which the following is a specification.

When a storage battery is used in connection with a multiple-wire system of electrical supply, it is usual to provide regulating-cells at the ends of each part of the battery in order to keep the pressure constant between the different pairs of wires, and when the battery is being charged it is usual to run a separate generator at sufficiently high pressure for the purpose or to use a booster to raise the usual pressure to charge the battery. According to my invention I avoid the use of regulating-cells and use a variable-pressure booster in series with each part of the battery between any pair of wires to raise the battery-pressure when it is less than that required, to reduce it when it is greater, or to raise the bus-bar pressure when it is required to charge the battery. Further, I arrange the booster so that as the outside load increases the bus-bar pressure is kept either constant or is raised, so as to counteract the effect of loss on the feeders, and also when the load on one pair of mains is greater than on another pair the booster enables the battery to provide the extra current required at the desired pressure. By reference to the diagram I show the arrangement for a three-wire system. A similar arrangement would be used for a five or seven wire system.

K L M are the bus-bars between which it is required to maintain constant pressure or to maintain pressure constant at a given load, so that as the load increases the pressure is raised, so as to compensate for the pressure loss in the outgoing feeders $e\ g\ f$, which supply energy to lamps $x\ x'$, motors $y$, or other consuming devices.

The battery $z$ is arranged so that at a normal state of charge it gives the correct voltage required on the bus-bar, or if the booster is to be kept always running when the battery is supplying current the number of cells may be so fixed that when the battery is fully discharged the pressure across its terminals is as much below the normal pressure required between K and L as it is above the normal when fully charged. In this way less cells may be used than are required in the ordinary way.

The middle point of the battery is connected to the bus-bar M. The outer ends are connected through the booster-armatures $b$ and $b'$ to the bus-bars K and L. Each of the boosters $b\ b'$ is provided with two windings on its field-magnets $n$ and $m$ and $n'$ and $m'$, and by arranging the currents through these windings the strength of the fields is varied, and hence the pressure given by the boosters. The boosters are so constructed as to give a pressure proportional to the field strength by working the iron or steel in the field-magnets at a low induction or by using a large gap between armature and field, or both, and the machines are so designed that the armatures when run at constant speed give the same pressure as that measured across the end of the field-coils which are wound with fine wire $n$ and $n'$.

P is a small exciting-machine whose armatures $a\ a'$ may be conveniently used on a common core working in a common shunt-wound field and so designed as to give nearly-constant pressure at all loads when run at constant speed. The two armatures are connected in series, the common point being connected to the middle point of the battery, the positive pole being connected to the positive pole of the battery through the coil $n$, and the negative pole of the armature $a'$ to the negative pole of the battery through the coil $n'$. The exciter is arranged so that the armatures $a$ and $a'$ give the pressure normally required between the bus-bars K M and M L.

When the battery is giving the same pressure as the armatures $a$ and $a'$, no current flows in the coils $n$ and $n'$. Also when the battery-pressure is lower than that required a current flows in each of the coils $n$ and $n'$, and the pressure across the end of the coils $n$ and $n'$ is the difference of the pressures given by the exciter-armature and either half of the battery $z$. The armatures of $b$ and $b'$ give the same pressure, and their poles are so arranged that they add to the battery-pressure, and so keep up the pressure of the bars K M M L. When the battery is discharging, its pressure usually falls, and as this occurs the difference between its pressure and that of the exciter increases, and so increases the pressure of the boosters $b$ and $b'$, so correcting for the falling off of the battery-pressure.

When it is required to charge the battery, a shunt or compound wound generator T is connected to the bus-bars K and L. As the battery becomes charged its pressure becomes greater than that given by the exciter, and a current then flows from the battery through the armatures $a$ $a'$ to the coils $n$ $n'$. The field of the boosters is thus reversed, and the boosters $b$ and $b'$ then raise the bus-bar pressure to the correct amount, so as to charge the battery.

It is necessary to compensate for the loss of pressure due to the resistance of the armatures $b$ and $b'$, and to do this the main current through $a$ and $a'$ may be taken around a compound winding on the fields in the ordinary way; but in order to cause the variation in pressure on the bus-bars K M and M L to depend on the external load I prefer to take the whole of the outgoing currents through the feeders $e f$ through the coils $m$ $m'$, or, as shown in the diagram, I can shunt off a part of the current by means of the shunts $l$ $l'$, and I may use a variable resistance in series with the coils $m$ $m'$, so that I can vary the proportion of the currents in these coils. The coils $m$ $m'$ are thus so arranged that they help the coils $n$ $n'$ to magnetize the fields of the boosters when the battery is discharging and oppose when the battery is charging, and the greater the external load on the feeders $e f$ the greater is the pressure on the armatures $b$ $b'$, and hence on the bus-bars K M M L, and by varying the amount of the shunted current in the coils $m$ $m'$ the effect of these coils can be varied, so as just to compensate for the loss in the armatures $b$ $b'$ or to raise the pressure to the desired extent on the feeders to compensate for loss in them. Further, when the load between $e g$ is greater than between $g f$ the pressure between $e g$ is kept the same as or greater than that between $g f$, as desired. The coils $m$ $m'$ also serve another function. Since their influence on the fields of the boosters is always in such a direction as to increase the pressure given by the boosters on discharge, the maximum discharging current is always greater than the maximum charging current, and this is a condition usually required with existing storage batteries.

Since the pressure given by a battery usually decreases as the rate of discharge is increased, while a compound-wound generator gives the same pressure or a slightly-greater pressure as the load on it is increased, a battery cannot work in parallel with such a generator; but by using the boosters, as described, in series with the battery the extra field given by the coils $m$ $m'$ causes the joint pressures given by each half of the battery and its booster to be constant at all rates of discharge or to be greater as the rate of discharge rises, and by arranging the proportion of the currents in the coils $m$ $m'$ so that the joint pressure of the battery and boosters rises at a slightly-greater rate or at the same rate as the pressure given by the compound-wound generator on a rising load the battery can be made to do its proper share of the work.

The boosters and the exciter may be conveniently mounted on a common shaft driven at nearly-constant speed by the electric motor C, or a steam-engine or other prime mover may be used, provided that it runs at nearly-constant speed.

The leads $h$ $j$ to the motor C may be connected to any source of electric energy at a suitable pressure. They may be connected to the bus-bars K L; but in that case the motor must be so designed that a slight increase in the pressure on the leads $h$ $j$ tends to cause the motor to run slightly slower and a slight reduction in pressure tends to increase the speed of the motor C.

It will be seen that the automatic reversible-field booster described, with its battery, serves to act as a regulator for the pressure on the bus-bars K M L no matter how the external load may vary, provided only that the variations are within the capacity of the battery. Also the arrangement of the boosters and battery described serves to maintain the pressure constant when the load on one side of the system is greater than on the other side, thus serving as a self-regulating balancing-machine.

Having thus described the nature of this invention and the best means I know of carrying the same into practical effect, I claim—

In combination with a three-wire electrical installation supplied from an accumulator-battery, a booster interposed between each terminal of the battery and the corresponding bus-bar, the said booster having a double-coiled field-magnet of which one of the coils is of fine wire and connects the pole of the battery to which the booster is connected to the armature of an exciter driven at constant speed by an electric or other motor which also drives the booster, substantially as and for the purpose set forth.

In testimony whereof I have hereunto set my hand in presence of two subscribing witnesses.

JOHN SOMERVILLE HIGHFIELD.

Witnesses:
 HY. LINDON RILEY,
 JOHN WORELEY.